A. R. HARTMANN.
INDICATOR.
APPLICATION FILED SEPT. 18, 1913.
1,127,618. Patented Feb. 9, 1915.
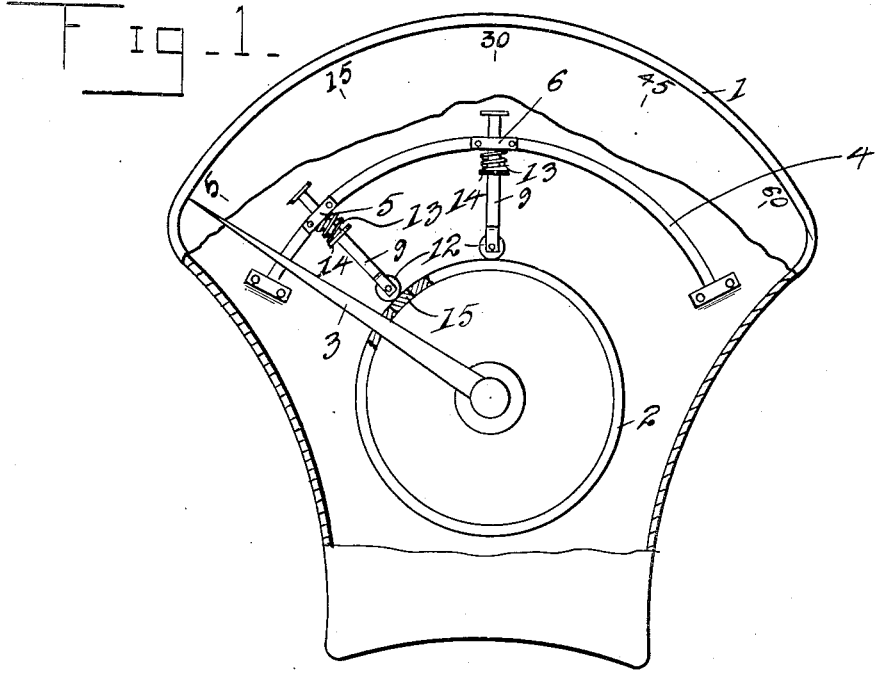
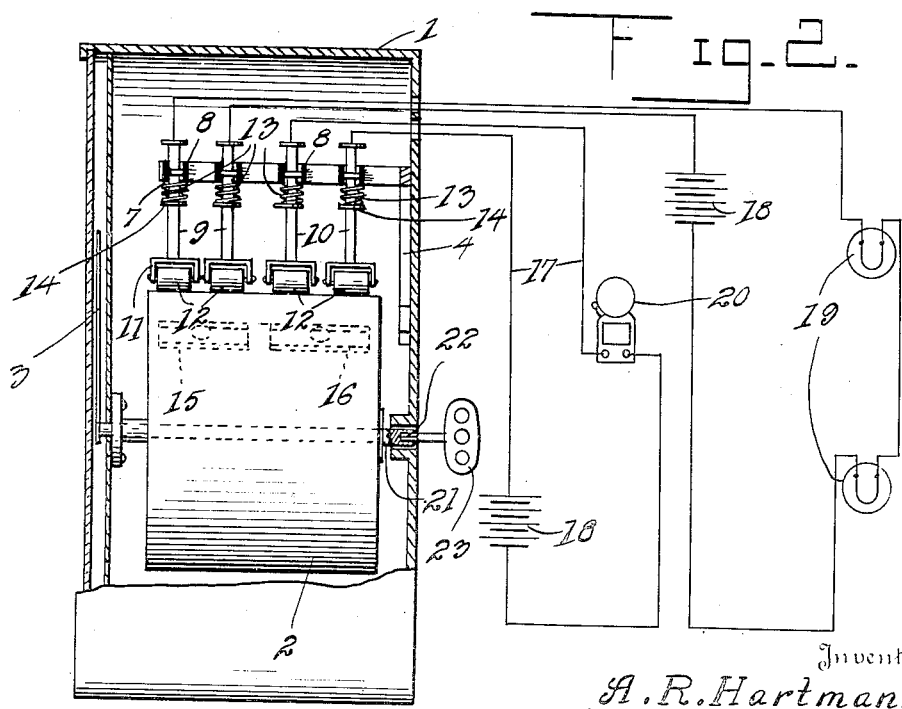
Witnesses
C. R. Bealle.
A. E. Johnson
Inventor
A. R. Hartmann.
By
Attorney

UNITED STATES PATENT OFFICE.

ARTHUR R. HARTMANN, OF HOUSTON, TEXAS.

INDICATOR.

1,127,618.  Specification of Letters Patent.  Patented Feb. 9, 1915.

Application filed September 18, 1913. Serial No. 790,465.

*To all whom it may concern:*

Be it known that I, ARTHUR R. HARTMANN, a citizen of the United States, residing at Houston, in the county of Harris and State of Texas, have invented certain new and useful Improvements in Indicators; and I do hereby declare the following to be a full, clear, and exact description of the invention, such as will enable others skilled in the art to which it appertains to make and use the same.

This invention comprehends improvements in indicators, and relates more particularly to an attachment for speed, pressure and other indicators which will close an electric circuit at predetermined times so that an audible signal may be sounded and a light lighted.

The primary object of the invention is to provide an attachment which is especially adapted for use in connection with speed indicators for vehicles so that the driver may be warned when a certain speed is reached and so that officers of the law and others may readily tell by glancing at the vehicle whether or not it is exceeding the speed limit.

Another and more specific object of the invention is to provide the rotary drum of an indicator with contact elements which, by moving into engagement with rollers carried upon slidable rods, will close electric circuits in which different indicating devices, such as lights and bells, may be connected.

With these and other objects in view as will become more apparent as the description proceeds, the invention consists in certain novel features of construction, combination and arrangement of parts as will be hereinafter fully described and claimed.

For a complete understanding of my invention, reference is to be had to the following description and accompanying drawings, in which—

Figure 1 is a front elevation of an indicator partly broken away and partly in section, showing my attachment secured thereto, and Fig. 2 is a vertical sectional view partly in elevation with some of the circuits diagrammatically shown.

Referring in detail to the drawings by numerals, 1 designates the casing of a speed indicator of any common or preferred type, 2 a revoluble drum forming a part of its construction, and 3 the indicator or pointer which moves with the drum.

In carrying out my invention I provide an arcuate bracket 4 secured to the rear wall of the casing on the interior thereof and formed with laterally projecting arms 5 and 6. Each arm is formed with a plurality of openings 7 arranged in pairs and containing insulating sleeves 8. Rods 9 and 10 are slidable through these openings at right angles to the periphery of the drum and each rod has formed upon its inner extremity a U-shaped frame 11 in which is journaled a contact roller 12. Coil springs 13 bear against collars 14 fixed to the rods and against the sleeves 8, serving to hold the rollers always in contact with the drum.

A pair of contact plates 15 and 16 are set into the periphery of the drum so as to lie flush therewith and are adapted to engage the rollers 12 as the drum is oscillated through any suitable means, not shown, to indicate the speed which a vehicle is traveling.

The rods which extend through the arm 5 may be positioned so that when the vehicle is traveling at the maximum speed, allowed within city limits, the contact plates 15 and 16 will be engaged with the contact rollers 12 of said rods. The rods which extend through the arm 6 may be so placed that when a vehicle is traveling at the maximum speed, allowed outside of the city limits, the contact plates 15 and 16 will be engaged with the rollers carried thereby. To each pair of rods, wires 17 are connected to form circuits through the batteries 18. In one circuit of each set of rods is preferably placed a pair of lights 19 which may be disposed at the front and rear of a vehicle so that an officer may see if the machine is exceeding the speed limit. The lights corresponding to one set of rods will be of a different color from the lights corresponding to the other set in order that the two speeds may not be confused. In the other circuit of each set, a bell 20 is preferably connected so that the driver may be warned that he is running at the maximum speed allowed.

In order that an officer may easily test an indicator to see if the electric circuits are intact, I provide the shaft 21 of the drum, with the socket 22 in which a key 23 may be inserted so that the drum may be manually turned to close the various circuits by bringing the contact plates 15 and 16 in engagement with the rollers 12.

From the foregoing description taken in connection with the accompanying drawings, it will be evident that I have provided a very simple attachment for indicators which will warn the driver of a vehicle when he is running at the maximum speed allowed by the law and which will also serve to indicate to the public the fact that the vehicle is traveling at excessive speed. If a vehicle travels so rapidly as to cause the contact plates to move beyond the rollers 12, the contacts will, of course, be broken, but when the vehicle is stopped by an officer, the drum will return to its normal position, and in so doing, the circuits will be momentarily restored, and thus give evidence of the fact that the vehicle was traveling at a speed greater than that allowed.

It will, of course, be understood that my attachment is adapted for indicators other than those of the kind described and referred to, and it will also be understood that minor changes in construction, combination and arrangement of parts may be made without departing from the scope and spirit of the invention as claimed.

Having thus described my invention, I claim:—

1. The combination with a speed indicator of a drum rotatable on the shaft of a speed indicator, said drum being formed of insulating material, contact plates carried by the drum, each of said contact plates extending from near the edge to near the center of the drum, a frame carried by the frame of the indicator, a plurality of spring pressed plungers carrying contact rollers mounted in the frame, said plungers being arranged to coöperate to complete a circuit through the contact plates and thereby control the operation of a signal, and means to manually actuate the drum to ascertain the condition of the signal.

2. The combination with an indicator having a casing, a shaft rotatable within the casing, a needle carried by the shaft, and a dial over which the needle travels, of a drum mounted on the shaft and arranged to rotate therewith, contact plates carried by the drum at spaced intervals around the periphery thereof, a frame secured within the casing, said frame comprising a plurality of segmental strips, supports at the ends of the segmental strips to hold the same in spaced relation, clamps carried by the segmental strips to form guide ways, spring pressed plungers slidable in the guide ways, contact rollers carried by the plungers and arranged to coöperate with the plates in the base of the drum to complete an electric circuit and thereby give a signal, and means to manually rotate the drum whereby the condition of the signal may be ascertained.

In testimony whereof I affix my signature in presence of two witnesses.

ARTHUR R. HARTMANN.

Witnesses:
LOLA B. BAILEY,
D. E. BAILEY.